(12) United States Patent
Graessner et al.

(10) Patent No.: US 8,369,585 B2
(45) Date of Patent: Feb. 5, 2013

(54) AUTOMATIC CLASSIFICATION OF INFORMATION IN IMAGES

(75) Inventors: Joachim Graessner, Boenningstedt (DE); Burckhard Terwey, Oldenburg (DE)

(73) Assignee: Siemens Aktiengesellschaft, Munich (DE)

( * ) Notice: Subject to any disclaimer, the term of this patent is extended or adjusted under 35 U.S.C. 154(b) by 862 days.

(21) Appl. No.: 12/253,749

(22) Filed: Oct. 17, 2008

(65) Prior Publication Data
US 2010/0098309 A1    Apr. 22, 2010

(51) Int. Cl.
*G06K 9/00*    (2006.01)

(52) U.S. Cl. .................................. 382/118; 382/115

(58) Field of Classification Search ............. 382/130, 382/131, 132, 294; 600/407
See application file for complete search history.

(56) References Cited

U.S. PATENT DOCUMENTS

| | | | | |
|---|---|---|---|---|
| 5,531,520 A * | 7/1996 | Grimson et al. | ............ | 382/131 |
| 6,708,184 B2 * | 3/2004 | Smith et al. | ............... | 1/1 |
| 7,092,749 B2 * | 8/2006 | Fowkes et al. | ............... | 600/407 |
| 7,792,778 B2 * | 9/2010 | Zhou et al. | ............... | 706/50 |
| 7,876,938 B2 * | 1/2011 | Huang et al. | ............... | 382/128 |
| 7,979,383 B2 * | 7/2011 | Heilbrunn et al. | ............ | 382/132 |
| 2007/0276214 A1 * | 11/2007 | Dachille et al. | ............... | 600/407 |
| 2010/0063977 A1 * | 3/2010 | Weese et al. | ................... | 707/769 |
| 2010/0189313 A1 * | 7/2010 | Prokoski | ........................ | 382/118 |
| 2010/0293164 A1 * | 11/2010 | Weese et al. | ................... | 707/737 |
| 2011/0295790 A1 * | 12/2011 | Zillner | ........................... | 706/55 |

OTHER PUBLICATIONS

El-Kwae (Content based retrieval in picture archiving and communication systems); Journal of Digital Imaging vol. 13 No. 2 (May, 2000)pp. 70-81.*

Saddi et al ( Region Based segmentation via non-rigid template matched, Oct. 2007, IEEE 11th international conference on computer vision 2007, pp. 1-7).*

Automated Meaning Extraction, "Computers Get the Picture," Pictures of the Future/Spring 2008, pp. 95-96.

* cited by examiner

*Primary Examiner* — Chan S Park
*Assistant Examiner* — Nancy Bitar
(74) *Attorney, Agent, or Firm* — Lempia Summerfield Katz LLC

(57) ABSTRACT

A system and method of analyzing and using volumetric data of a patient is disclosed. Volumetric data characterizing a patient is obtained using an imaging modality such as a computerized tomographic device (CT), magnetic resonance imager (MR), or other tomographic modality. The volumetric data or image slices derived from the data is compared with anatomical image or model data from an anatomical atlas so as to associate the patient data with a body structure. The anatomical association is used as a search term in a data base to retrieve information which may be useful in diagnosis or treatment of the patient.

19 Claims, 3 Drawing Sheets

US 8,369,585 B2

AUTOMATIC CLASSIFICATION OF INFORMATION IN IMAGES

TECHNICAL FIELD

The present application generally relates to the analysis of images obtained by an imaging modality so as to relate morphological features of the image to named structures in an atlas of images of a body and the use of such identifications as part of a data base search strategy.

BACKGROUND

The practice and teaching of medicine has evolved from one in which the student was taught anatomy as a fundamental aspect of education, and the education included dissections of human cadavers, to one in which anatomy is a small part of the overall study of medicine both in terms of class time and in experience, as dissections are less and less common. Further, many hospital workers need some knowledge of anatomy in addition to that possessed by physicians.

Traditionally, images of the interior of a patient were obtained using X-ray technology which produced two-dimensional (2D) projections, or radiographs, on a film medium, representing the total attenuation of the X-ray beam passing through the body. More recently, computerized tomography (CT) using a spiral scan or a rotating C-arm X-ray device, for example, collects X-ray data suitable for processing to determine the volumetric attenuation of the X-ray beam. This analysis produces data in a three dimensional data set of individual voxels, which may represent the specific attenuation of a volume of material centered on a resolution cell size of the imaged volume. Thus the voxels may be used to identify materials having the same or similar specific attenuation.

The data may be presented for visualization in, for example, "slices", which represent a plane having a specific orientation with respect to the voxel data so that the specific absorption of the voxel is represented by display intensity. The specific absorption values may be used to provide a "false color" image where ranges of absorption values, or other image property, are associated with a color. Volumetric visualization may include the segmentation of the voxel data set so as to amalgamate voxels having a contiguous nature and having properties that are consistent with a specific tissue type, such as bone, fluid, or the like, so as to be representative of an organ, such as the heart, blood vessels, or a kidney. The segmented data may be used to eliminate certain organs or structures form the displayed data so as to permit better visualization of the remainder of the image, or the segmented organ or structure.

Such data may be generated from image data obtained with a three-dimensional imaging technique. Computerized tomography (CT), magnetic resonance imaging (MR) rotational C-arm radiography, and 3D ultrasound are examples. A technique of a group of related techniques such as these is often termed "an imaging modality."

Historically, atlases of anatomical information have been produced, originally using drawings and progressing to photographs; more recently data bases of images taken with various imaging modalities have been produced and the images may be displayed with manually applied anatomical identification. Generally these are sparse representations of the overall data set, as the overall quantity of data is considered too great for human comprehension.

SUMMARY

A method of identifying anatomical features of a patient image is described, the method including obtaining a volumetric image data set for a patient using an imaging modality; storing the image data set in a data base; retrieving at least a subset of the image data using a selected observer point of view; associating a portion of the image data with an anatomical model; and assigning a anatomical descriptor to the identified portion of the image data.

In an aspect, a data analysis and retrieval system, includes a processor capable of executing instructions stored on an storage medium, causing the processor to accept data from a first data base, the data representing volumetric information of a patient obtained by an imaging modality; segment the data to separate the volumetric information to correspond to an organ or system of the body; retrieve an anatomical model of a organ or system from a second data base; determine whether the segmented volumetric information corresponds to the anatomical organ; and, formulate a search query using the nomenclature of the determined anatomical organ as a search term in a data base search of a third data base.

In another aspect, a computer program product includes a computer-readable medium having computer-readable program code embodied thereon, the program code executable on a computer to process image data by accepting data from a first data base, the data representing volumetric information of a patient obtained by an imaging modality; segmenting the data to separate the volumetric information to correspond to an organ or system of the body; retrieving an anatomical model of a organ or system from a second data base; and determining whether the segmented volumetric information corresponds to the anatomical organ.

DETAILED DESCRIPTION

Figure 1:
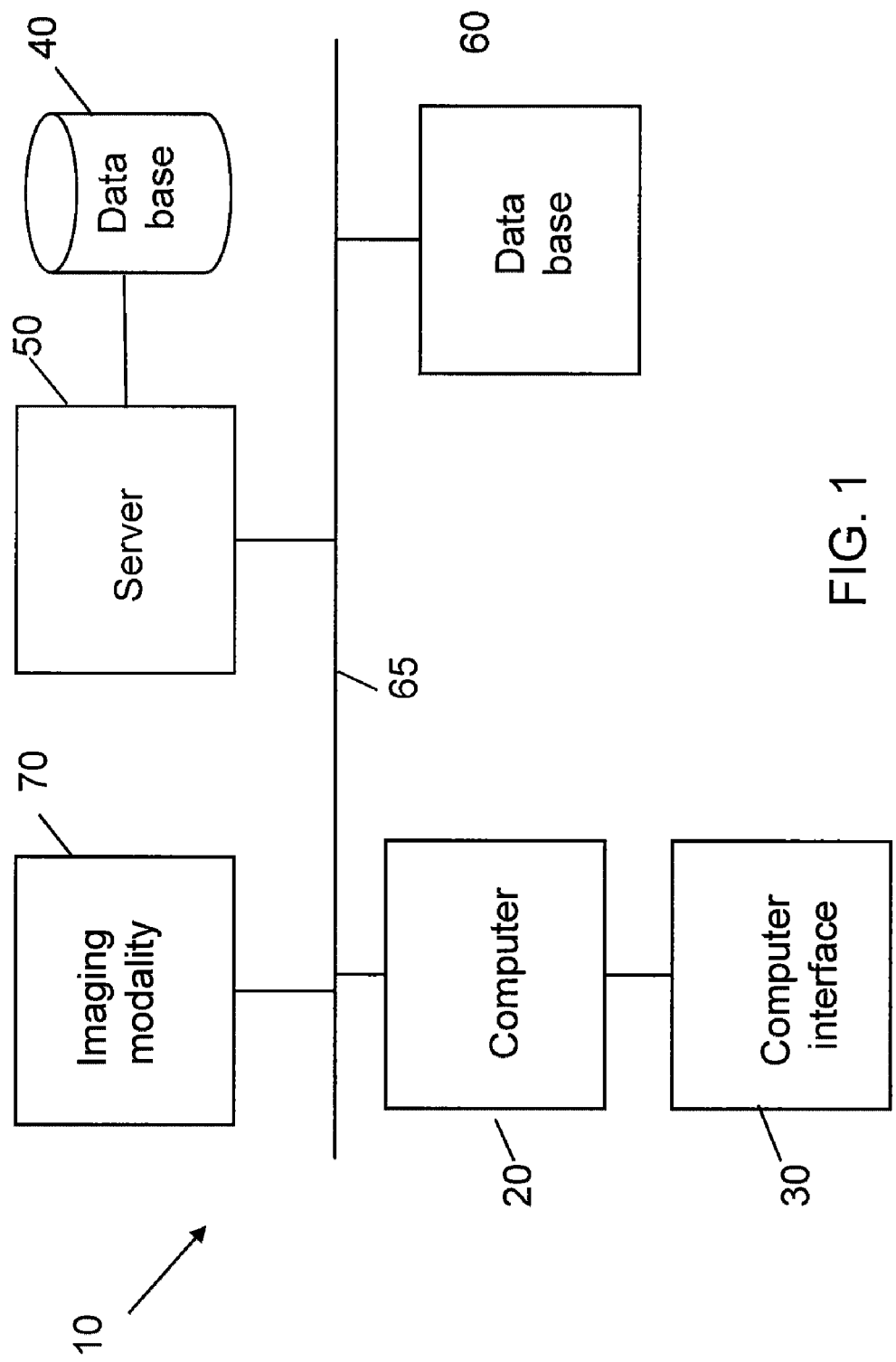
FIG. 1 is a block diagram illustrating an embodiment of the invention.

Exemplary embodiments may be better understood with reference to the drawings, but these embodiments are not intended to be of a limiting nature. Like numbered elements in the same or different drawings perform similar functions.

The combination of hardware and software to accomplish the tasks described herein may be termed a platform, or system. The instructions for implementing processes of the platform may be provided on computer-readable storage media or memories, such as a cache, buffer, RAM, removable media, hard drive or other computer readable storage media. Computer readable storage media include various types of volatile and nonvolatile storage media. The functions, acts or tasks illustrated or described herein may be executed in response to one or more sets of instructions stored in or on computer readable storage media. The functions, acts or tasks may be independent of the particular type of instruction set, storage media, processor or processing strategy and may be performed by software, hardware, integrated circuits, firmware, micro code and the like, operating alone or in combination. Some aspects of the functions, acts, or tasks may be performed by dedicated hardware, or manually by an operator.

In an embodiment, the instructions may be stored on a removable media device for reading by local or remote systems. In other embodiments, the instructions may be stored in a remote location for transfer through a computer network, a local or wide area network, by wireless techniques, or over telephone lines. In yet other embodiments, the instructions are stored within a particular computer, system, or device.

Where the term "network", "web" or "Internet", or the like, is used, the intent is to describe an internetworking environment, which may include both local and wide area telecommunications networks, where defined transmission protocols are used to facilitate communications between diverse, possibly geographically dispersed, entities. An example of such an environment is the world-wide-web (WWW) and the use of the TCP/IP data packet protocol, and the use of Ethernet or other known or later developed hardware and software protocols for some of the data paths. Often, the internetworking environment is provided, in whole or in part, as an attribute of the facility in which the platform is located.

Communications between the devices, systems and applications may be by the use of either wired or wireless connections. Wireless communication may include, audio, radio, light wave or other technique not requiring a physical connection between a transmitting device and a corresponding receiving device. While the communication may be described as being from a transmitter to a receiver, this does not exclude the reverse path, and a wireless communications device may include both transmitting and receiving functions. Such wireless communication may be performed by electronic devices capable of modulating data as a signal on a carrier wave for transmission, and receiving and demodulating such signals to recover the data. The devices may be compatible with an industry standard protocol such as IEEE 802.11b/g, or other protocols that exist, or may be developed.

An image of a volume obtained by an imaging modality may be viewed in a 2D version (typically slices or a maximum intensity projection) or in a 3D visualization. Models of the volume may be available as average representations of a patient class (e.g., male, aged 30-65 years), and these models may be of body regions, organs or systems. The combination of volumetric data and a model may be termed a scene, where the scene is intended to give a contextual aspect to the imaging data. The volumetric image data may be stored as an array of voxel data, the data for a voxel representing individual unit volume at the resolution of the imaging modality, or as sets of image data, representative of slices through the volume.

As a consequence of the resolution limitations of the various imaging modalities, the identification of individual aspects, such as organs and vasculature of the body is comparable to "gross anatomy", where those features which would be apparent to the unaided eye are being identified and studied. One may analogize this aspect of medical imaging to a virtual dissection of the body. When describing a human body using gross anatomy, related portions of the anatomy are often described as a system separately from the other systems. Such bodily systems may be, for example, the skeletal, digestive, muscular, lymphatic, cardiovascular, urinary, and the like. These often correspond to medical specialties.

Header data may be associated with each data array or image so that the images or volumetric may be retrieved and displayed in accordance with a standardized nomenclature.

Often, the 2D representation of the volume is in terms of planar slices in three orthogonal planes, axial (A), sagittal (S), and coronal (C). Other planar representations such as oblique slices and warped planes may be synthesized from the voxel data. Where the 3D representation is used, the orientation of the viewing point with respect to the patient may be described as R: Right, L: Left, A: Anterior, P: Posterior, S: Superior, and I: Inferior.

Slices of the model, where the model has been segmented to separately illustrate, for example, vessels, bones, grey matter, muscle, and the like, may be selectively superimposed on the image data so as to assist in visualizing the situation. Where the 3D data sets of images have been processed into slices, the data may be stored in a medical data system, and the slices or volumetric data identified by tags, or other metadata. The current standard for such tagging is the DICOM (Digital Communications in Medicine) standard developed by the National Electrical Manufacturers Association (NEMA, Rosslyn, Va.) in 1993, and is intended to ensure the interoperability of systems used to: produce, store, display, process, send, retrieve, query or print medical images and derived structured documents as well as to manage related workflows. However, other tagging and retrieval systems may be used.

There are software tools that exist or are being developed so as to conveniently manipulate the volumetric data sets so as to, for example select slices of in a 2D (slice) view, such as an axial view of a brain and, by manipulating a slider on a graphical user interface, to rotate, zoom or otherwise change the viewpoint of a 3D image, or to superimpose previously segmented identifiable tissues or organ types on the slice image. Such slices may be computed as required from a volumetric data set, or retrieved from an image data base based on, for example, DICOM parameters.

As each individual person has a different size, otherwise functionally identical organs in different patients may have somewhat different shapes, orientations or locations, and software to transform the size and shape of the anatomical models so as to best match the characteristics of the volumetric data, or slice image of the patient, have been developed.

A system and method of associating features of an image of a patient with a corresponding image data in an anatomical data base, and annotating the patient images with the nomenclature in the anatomical data base, includes a source of medical images of the patient, a computer system for archiving and retrieving the image data, and a data base representing the anatomical data. The anatomical data may be, for example, a statistically representative volumetric data set for each structure. The imaging modality may be a separate system and have provided the data to an archive, where the image data is identified by, for example DICOM tags. The analysis of the image data may be by retrieving either the volumetric data (voxel data) or one of more of identified 2D slice images (pixel data) and associating the features of the patient image with corresponding structures in the anatomical data base. The statistically representative model of the body structure may be adjusted in dimension and orientation so that a "best fit" with the patient image data is achieved. Once the corresponding structures have been identified, the patient data image may be automatically overlaid with nomenclature extracted from the anatomical data base. This nomenclature may serve as a link to data bases containing relevant medical literature and treatment protocols, and to the medical data history for the patient.

Selecting the appropriate anatomical view may be by looking up the study description, DICOM tag such as (0008,1030) and/or the Performed Procedure Step Description such as (0040,0254), which leads to the organ (e.g., knee); the registered Study description or Series Names may, for example, also be used for this purpose. The location of the slice image with respect to the body orientation may be used to search the anatomical data base for the closest corresponding image and image descriptors. The image from the anatomical data base may also be represented in slices with the same orientation as that of the patient image, and slices disposed about the initial slice viewed or processed so as to ascertain the best match.

An enhanced version of this procedure may allow automatic scrolling to the slice location in the anatomical atlas by pattern recognition in the body image. The anatomical model body image may be considered a median model and the model image may be translated, morphed or otherwise adjusted to achieve a best fit to the actual data. Generally, it is the images in the anatomical data base or the organ models that are modified, and the integrity of the individual patient data maintained, although this is not intended to be a limitation.

While the matching of the patient data to the atlas or model data has been described with respect to a two dimensional image (slice), volumetric data may be similarly used. Volumetric data (voxels) may be analyzed so as to segment the imaged volume into identifiable regions such as an organ, bone, vessels and the like, and the atlas or model data for the same region used to define the volumes of the various structures, which may then be associated with the nomenclature of the structures as obtained from the atlas or organ. Within an organ, for example, various detailed structures also may be identified in the atlas, and the nomenclature applied to the patient image. The resultant image may be considered as a new information object, and assigned appropriate DICOM image tags and stored along with the original study.

In addition to computer-graphical aided identification of the structures, which may be segmented, or shown in false color representing image density, a skilled person may use a tabular listing of such structures in an atlas for gross anatomy so as to make the associations of image regions with bodily structures.

Associating images with bodily structures is akin to gross anatomy, and the anatomical identifications of the images may be linked to semantic data base information retrieval, where the associated image is now capable of being used as a search term in the accessible data bases. Such data bases may include individual patient data, medical literature, treatment protocols, and the like. The data bases may be local or accessible over a wide area network, such as the Internet. As more than one aspect of the volumetric data is associated with a corresponding anatomical structure, based on the medical analysis of the image, information relating to, for example contrast media identification of tumors, stenosis, and the like, may be synergistically included in the semantic search.

FIG. 1 illustrates a system 10 for processing such image data. A computer 20 having a display 30 communicates with a medical data image data base 40 on a server 50, where data having a DICOM-compatible format is stored. Another accessible data base 60 may contain anatomical model data, medical literature, patient data, or treatment protocols. The communication between system components may be over a network 65, which may be a local area network (LAN) or over a wide area network (WAN), which may be the Internet, or by other data communications devices, which may be either wired or wireless.

An imaging modality 70, which may be any of the known or to be developed devices for obtaining data on bodily tissues by X-ray, magnetic resonance, positron emission tomography, ultrasound, or the like, collects and formats volumetric imaging data of a patient for storage in the data base 40. As the differing imaging modalities use differing physical phenomenon such as x-ray attenuation, magnetic spin, and the like, the volumetric image data sets may be processed in differing ways to visualize the bodily structures. Each of the techniques has advantages and disadvantages, such as cost, timeliness, ease of interpretation, sensitivity to tissue or contrast agent characteristics, susceptibility to imaging artifacts, and the like, and the selection of a specific imaging modality is made by the physician based on a variety of indications. Here, we are addressing the association of the data obtained by any one or more of the imaging modalities with an atlas of bodily structures for convenience of interpretation, reporting, data base searching, or the like.

Figures 2A, 2B:
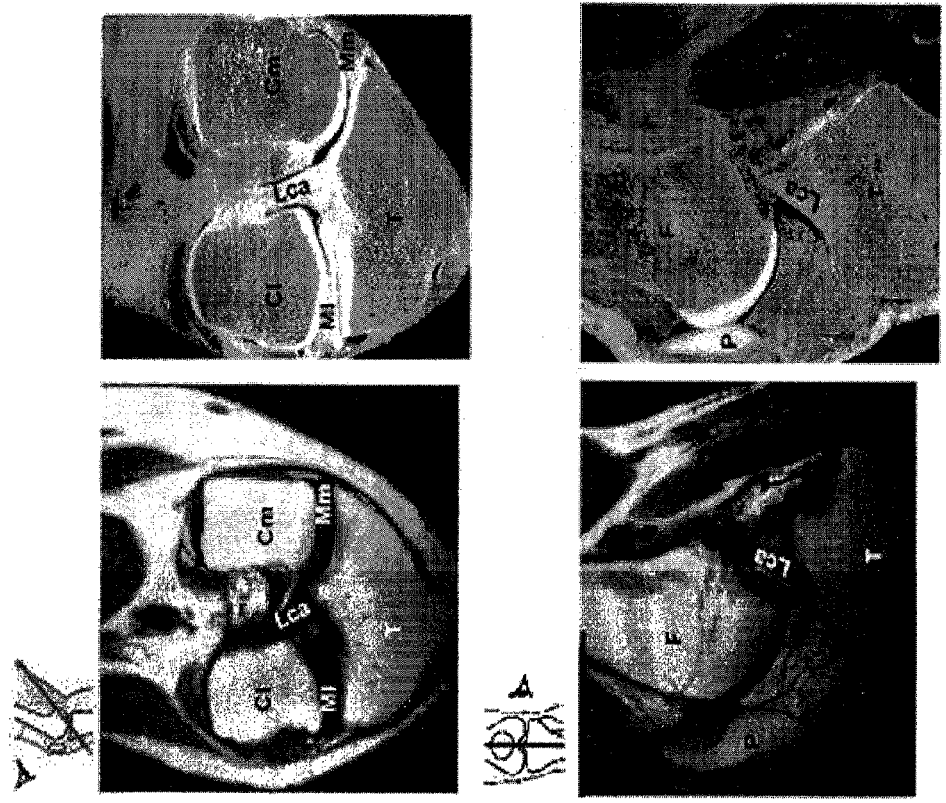
FIG. 2 is a comparison of (a) sagittal and coronal MR image slices of a patient, tilted (plane of the anterior crucial ligament) as shown by the viewpoint icon; and, (b) corresponding photographs taken of a cadaver with organs and structures identified.

FIG. 2 shows a pair of MR slice images (a) and corresponding photographs of a cadaver (b) sectioned at the same plane. In this instance, the images are two views of the knee, with an eye symbol showing the point-of-view, and a line indicating the slice plane location within the patient body. In this example, T=Tibia; F=Femur; P=Patella; ML/Mm=Meniscus lateral/medial; CL/CM=Condyle lateral/medial; and, LCA=anterior crucial ligament. The labels are considered to be present in the right hand images as embedded in the metadata of the photographic images or inserted in the image data itself. Once the association between the slices and the atlas is made, either manually or automatically, the annotation data may be applied to the image and, if desired, the annotated image stored as part of the study. Similarly, a volumetric association of segmented portions of the volumetric data may be associated with statistical model representations of organs, or other body systems.

In an aspect, a method of associating medical image data with a corresponding bodily structure may include: obtaining a medical image of a patient, where the imaging modality is capable of producing volumetric data representing local tissue characteristics; storing the volumetric data in a data base; segmenting the volumetric data by a characteristic so that one or more organs or bodily structures or volumes is separable from the remaining image data; retrieving a representative model of the organ to be associated with the volumetric data and adjusting the dimensions of the model within plausible limits so as to achieve a fit to the image data; and, associating the name of the model organ with the volumetric data.

The plausible limits for adjusting the model organ may be related to the data originally used to formulate the model, where the probability of a dimension or combination of dimensions may be used to assess whether a correct association has been made.

In an aspect, the volumetric data may be processed so as to produce image slices and the image slices may be displayed, for example, in false color. Corresponding image slices of a bodily structure model may be fit to the false color image based on the orientation of the image slice.

In another aspect, the image data may be associated with a bodily structure by a skilled operator using a gross anatomy atlas and standard anatomical terminology.

In a further aspect, the identified bodily structure may be used as a search term in a data base search. A plurality of bodily structures may be identified from a volumetric data set, or data sets of an individual, with or without contrast media, and the bodily structures may include, tumors, stenosis, fluid masses, and the like. The plurality of bodily structures identified may be used in combination as the basis for the data base search.

Figure 3:
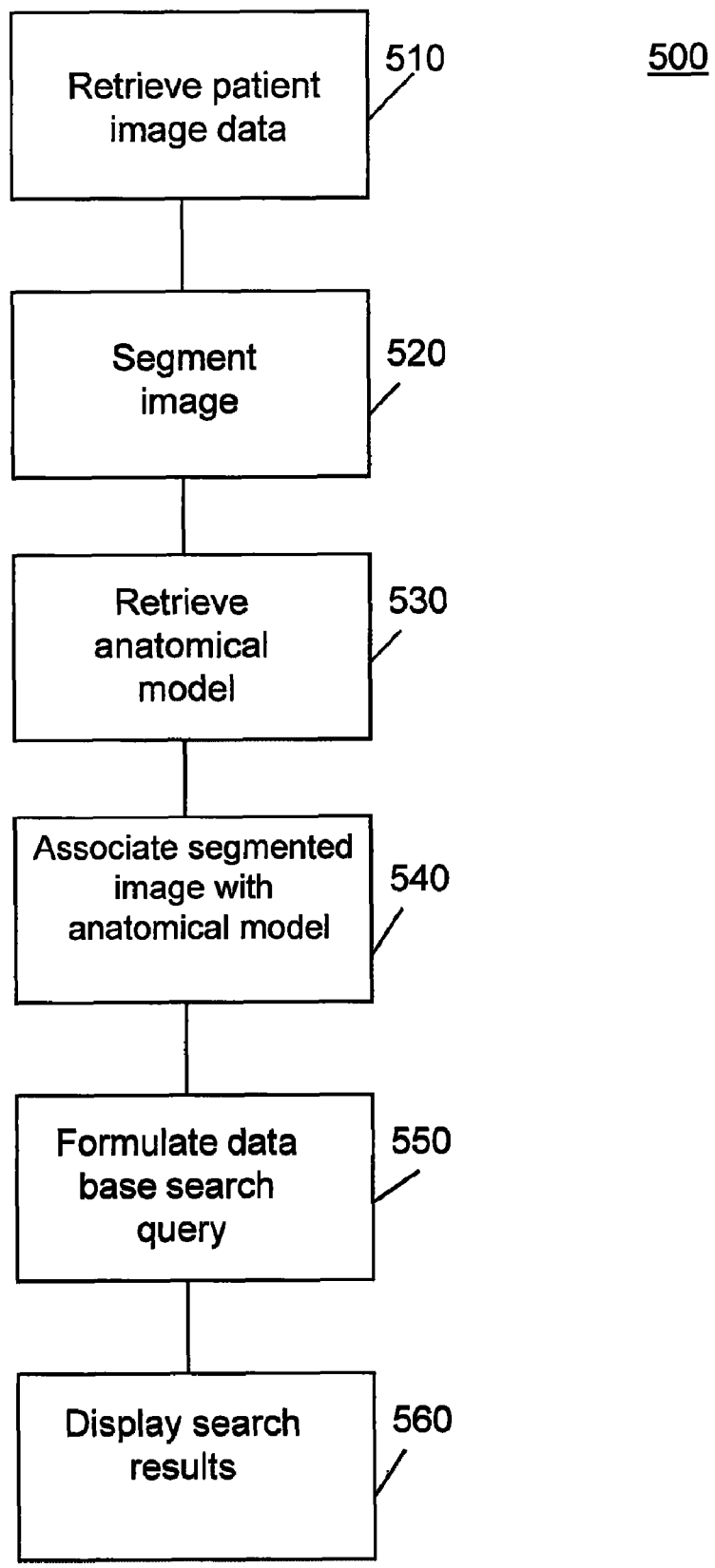
FIG. 3 is a flow chart of a method of identifying image data with corresponding anatomical features.

Specifically, FIG. 3 shows the steps in a method 500 of interpreting volumetric image data so as to associate the image data with bodily structures and in retrieving information from data bases.

Volumetric data of a patient is obtained using an imaging modality or is retrieved from a first data base (step 510). A portion of the data is processed so as to segment or otherwise differentiate bodily structures (step 520). Anatomical models of structures which may be located in a body region corresponding to the image data are retrieved from an anatomical data base (step 530). Either volumetric data or image slice data of the patient is compared with the anatomical models so that an anatomical model may be associated with image data of the patient (step 540). The identified anatomical feature is used as a search term in a query to a medical data base (550); and the retrieved data is displayed for use (step 560).

The examples of diseases, syndromes, conditions, and the like, and the types of examination and treatment protocols described herein are by way of example, and are not meant to suggest that the method and apparatus is limited to those named, or the equivalents thereof. As the medical arts are continually advancing, the use of the methods and apparatus described herein may be expected to encompass a broader scope in the diagnosis and treatment of patients.

It is intended that the foregoing description be regarded as illustrative rather than limiting, and that it be understood that it is the following claims, including all equivalents, that are intended to define the spirit and scope of this invention.

What is claimed is:

1. A method of identifying anatomical features of a patient image, the method comprising:
    acquiring a volumetric image data set for a patient using an imaging modality;
    storing the volumetric image data set in a first data base;
    retrieving at least a subset of the volumetric image data set using a selected observer point-of-view;
    segmenting the volumetric image data set to correspond to an anatomical structure of the body of the patient;
    associating the segmented volumetric image data set with a model of an anatomical structure; and
    when the segmented volumetric image data set that is associated with the model of the anatomical structure, superimposing nomenclature to include an anatomical descriptor associated with the model of the anatomical structure onto the segmented volumetric image data set, and formulating a search query using the nomenclature as a search term in a data base search of a further data base.

2. The method of claim 1, wherein the further data base is a database of patient information, medical literature, or treatment protocols.

3. The method of claim 1, wherein the model of the anatomical structure is a statistical volumetric model of a body structure.

4. The method of claim 3, further comprising associating the statistical volumetric model of the body structure with a body system in a gross anatomy atlas.

5. The method of claim 3, further comprising storing the model of the anatomical structure in a further data base.

6. The method of claim 4, further comprising adjusting the statistical volumetric model of the body structure to match with the subset of the volumetric image data set or another subset of the volumetric image data set.

7. The method of claim 1, wherein associating the portion of the volumetric image data set with the model of the anatomical structure comprises associating the segmented volumetric image data set with a model of the same anatomical structure.

8. The method of claim 1, wherein formulating the search query comprises formulating the search query using the nomenclature and a further anatomical descriptor associated with the model of the anatomical structure as search terms.

9. The method of claim 1, wherein the imaging modality is a computerized tomographic apparatus (CT), a magnetic resonance imager (MRI), or other tomographic system.

10. A data analysis and retrieval system comprising:
    a processor operable to execute instructions, stored on a storage medium, causing the processor to:
        accept data from a first data base, the data representing volumetric information of a patient obtained by an imaging modality;
        segment the data to separate the volumetric information to correspond to an organ or system of the body of the patient;
        retrieve an anatomical model of an organ or system from a second data base;
        determine when the segmented volumetric information corresponds to the anatomical model of the organ or system; and
        when the segmented volumetric information corresponds to the anatomical model of the organ or system, superimpose nomenclature to include an anatomical descriptor associated with the corresponding anatomical model onto the segmented volumetric information, and formulate a search query using the nomenclature as a search term in a third data base.

11. The system of claim 10, wherein the third data base is patient medical data, medical literature, or treatment protocols.

12. The system of claim 10, wherein the volumetric information and the anatomical model are displayed as slice images.

13. The system of claim 12, wherein a point of view and locations of the image slices are controlled by a user through a computer interface.

14. The system of claim 10, wherein the third data base is accessible over a network.

15. In a non-transitory computer-readable medium having computer-readable program code embodied thereon, the computer-readable program code executable on a computer to process image data by:
    accepting data from a first data base, the data representing volumetric information of a patient obtained by an imaging modality;
    segmenting the data to separate the volumetric information to correspond to an organ or system of the body of the patient;
    retrieving an anatomical model of the organ or system from a second data base; and
    determining when the segmented volumetric information corresponds to the anatomical model of the organ or system,
    wherein determining comprises identifying slices of the anatomical model of the organ or system having a same orientation as slices of the segmented volumetric information, and
    when the segmented volumetric information corresponds to the anatomical model of the organ or system, superimposing nomenclature to include an anatomical descriptor associated with the corresponding anatomical model onto the segmented volumetric information, and formulating a search query using the nomenclature as a search term in a data base search of a third data base.

16. The method of claim 6, wherein adjusting the statistical volumetric model of the body structure comprises adjusting a dimension, shape, or orientation of the statistical volumetric model.

17. In a non-transitory computer-readable medium having computer-readable program code embodied thereon, the computer-readable program code executable on a computer to process image data by:

accepting data from a first data base, the data representing volumetric information of a patient obtained by an imaging modality;

segmenting the data to separate the volumetric information to correspond to an organ or system of the body of the patient;

retrieving an anatomical model of the organ or system from a second data base;

determining when the segmented volumetric information corresponds to the anatomical model of the organ or system;

superimposing, when the segmented volumetric information corresponds to the anatomical model of the organ or system, nomenclature to include an anatomical descriptor associated with the corresponding anatomical model onto the segmented volumetric information;

formulating a search query using nomenclature; and using the search query as a search term in a data base search of a third data base.

18. The method of claim 1, wherein segmenting the volumetric image data set comprises segmenting the volumetric image data set to correspond to an organ or system of the body of the patient, and wherein associating comprises associating slices of the model of the anatomical structure having a same orientation as slices of the segmented volumetric information.

19. In a non-transitory computer-readable medium having computer-readable program code embodied thereon, the computer-readable program code executable on a computer to process image data by:

accepting data from a first data base, the data representing volumetric information of a patient obtained by an imaging modality;

segmenting the data to separate the volumetric information to correspond to an organ or system of the body of the patient;

retrieving an anatomical model of the organ or system from a second data base;

determining when the segmented volumetric information corresponds to the anatomical model of the organ or system;

superimposing, when the segmented volumetric information corresponds to the anatomical model of the organ or system, nomenclature to include an anatomical descriptor associated with the corresponding anatomical model onto the segmented volumetric information;

formulate a search query using the nomenclature as a search term in a data base search of a third data base; and displaying a result of the data base search of the third data base.

\* \* \* \* \*